United States Patent [19]

Saulnier et al.

[11] Patent Number: 4,778,422
[45] Date of Patent: Oct. 18, 1988

[54] BUOY FOR STORING ROPE CONNECTED TO AN UNDERWATER ARTICLE

[75] Inventors: Kenneth D. Saulnier, Yarmouth; Hubert J. Van Leeuwen, Amherst, both of Canada

[73] Assignee: Rollitech Industries Limited, Yarmouth, Canada

[21] Appl. No.: 802,413

[22] Filed: Nov. 27, 1985

Related U.S. Application Data

[63] Continuation-in-part of Ser. No. 665,274, Oct. 26, 1984.

[30] Foreign Application Priority Data

Nov. 22, 1983 [CA] Canada .................................. 441630

[51] Int. Cl.$^4$ ............................................. B63B 22/18
[52] U.S. Cl. ........................................ 441/26; 43/43.1
[58] Field of Search .................. 114/254; 441/1, 6, 23, 441/24–26; 43/43.1, 43.11, 44.87, 44.13, 102–104

[56] References Cited

U.S. PATENT DOCUMENTS

| | | | |
|---|---|---|---|
| 2,030,768 | 2/1936 | Schultz | 441/26 |
| 2,190,113 | 2/1940 | Chreitzberg | 43/51 |
| 3,005,215 | 10/1961 | Colt | 441/26 |
| 3,006,309 | 10/1961 | Rowley | 114/254 |
| 3,089,156 | 5/1963 | Hamm | 441/23 |
| 3,162,870 | 12/1964 | Laird | 441/26 |
| 3,196,469 | 7/1965 | Anthony | 441/25 |
| 3,340,644 | 9/1967 | Lintz | 43/43.1 |
| 3,364,613 | 1/1968 | Sewell | 43/43.11 |
| 3,441,962 | 5/1969 | Williams | 441/25 |
| 4,014,478 | 4/1977 | Bonacina | 242/107 |
| 4,103,379 | 8/1978 | Wolfe . | |
| 4,107,804 | 8/1978 | Bennett | 441/24 |
| 4,195,380 | 4/1980 | Higgs | 441/26 |
| 4,238,864 | 12/1980 | Kealoha | 441/25 |
| 4,262,379 | 4/1981 | Jankiewiez . | |
| 4,393,803 | 7/1983 | Donalies | 114/254 |

FOREIGN PATENT DOCUMENTS

| | | | |
|---|---|---|---|
| 482582 | 11/1975 | Australia . | |
| 922382 | 1/1955 | Fed. Rep. of Germany . | |
| 2411561 | 8/1979 | France | 242/84.1 A |
| 736920 | 6/1980 | U.S.S.R. . | |

Primary Examiner—Sherman D. Basinger
Assistant Examiner—Jesûs D. Sotelo
Attorney, Agent, or Firm—Beveridge, DeGrandi & Weilacher

[57] ABSTRACT

A buoy for storing rope connected to an underwater article such as lobster pot comprises a buoyant casing having two side portions connected together and a reel rotatably mounted between the side portions and carrying a length of rope one or both outer ends of which are connectible to the lobster pot or the like article. A central portion of one end of the reel is accessible from a side of the buoy through the adjacent casing side portion, and this one end has a non-circular configuration adapted to be engaged by a winding device such as a so-called "pot-hauler". The side portions may be connected together by posts. An end of rope may be connected to the reel by a swivel link so that when the rope is fully paid out the buoy can remain on the surface of the water and can rotate relative to the rope. The buoy is preferably made with two identical side portions of plastics material, and may have rigid molded buoyant foam material held between the side portions.

11 Claims, 7 Drawing Sheets

BUOY FOR STORING ROPE CONNECTED TO AN UNDERWATER ARTICLE

This application is a continuation-in-part of U.S. patent application Ser. No. 665,274, filed Oct. 26, 1984.

The present invention relates to a buoy for storing rope connected to an underwater article, especially a lobster pot of the type commonly used in the lobster fishing industry.

In the most commonly used method of lobster fishing, lobster pots are marked by simple solid buoys each connected to a lobster pot by a rope. When the lobster pots are being set out a fishing boat may carry more than one hundred pots, each connected to its buoy by a coil of rope. The coils of rope lie all over the floor of the boat and often become tangled in each other. More seriously, the rope also may become entangled in a fisherman's feet and this can cause the man to be carried overboard when a number of pots are thrown over together; many accidents of this type have occurred over the years.

In another kind of lobster fishing, known as trawl fishing, a series of lobster pots are connected by ropes, and only the endmost pot has a buoy. The ropes connecting the pots may be about 80 ft. (say 25 metres) long and are stored in coils on the bottom of a boat when the pots are being transported; hence these give rise to the same problems as mentioned above with respect to the buoy ropes.

The present invention is a buoy particularly useful for lobster fishing, which eliminates the nuisance and danger of tangled ropes by storing these on a reel in the buoy. The buoy has a buoyant casing with two side portions connected together and with a reel rotatably mounted between the side portions and carrying a length of rope connectible at its outer end to a lobster pot (for regular use), or at both outer ends to two adjacent pots (in trawl fishing), so that the rope is almost entirely contained within the buoy until the lobster pot and buoy are thrown out of the boat.

Buoys having reels for marking underwater objects, particularly scuba divers and wrecks, have previously been described in the patent literature. However the buoy of this invention has some special features which make it particularly suitable for its intended purpose.

Firstly, in accordance with one aspect of the invention, a central portion of one end of the reel is accessible from a side of the buoy through the adjacent casing side portion and this central portion has a non-circular configuration adapted to be engaged by winding means. Such winding means may be simply a removable handle, but preferably the winding means is an adaptation of a so-called "pot-hauler" which is a winch type device already used in lobster fishing boats.

In accordance with another aspect of the invention, the rope is connected to the reel by means of a swivel link which is rotatable within a transverse bore in the reel so that when the rope is fully paid out from the reel the buoy is free to rotate relative to the rope and such rotation does not cause entanglement of the rope.

The side portions of the buoy preferably each comprise a casing part formed as a single piece of plastics material designed for one-step molding, the side portions being of C-shape and symmetrically oppositely arranged to define a recess for the reel. Each side portion may be identical to the other and may have an inwardly projecting sleeve portion, the two opposed sleeve portions being aligned for holding shaft portions of the reel. Each side portion has inwardly directed posts with end formations fastenable to the end formation of an opposed post.

The invention will be more particularly described with reference to the accompanying drawings which show a preferred embodiment, and in which:

FIG. 2 shows a sectional elevation through a first type of buoy, and also shows (in broken lines) a winch device or so-called "pot-hauler"

Figure 1:
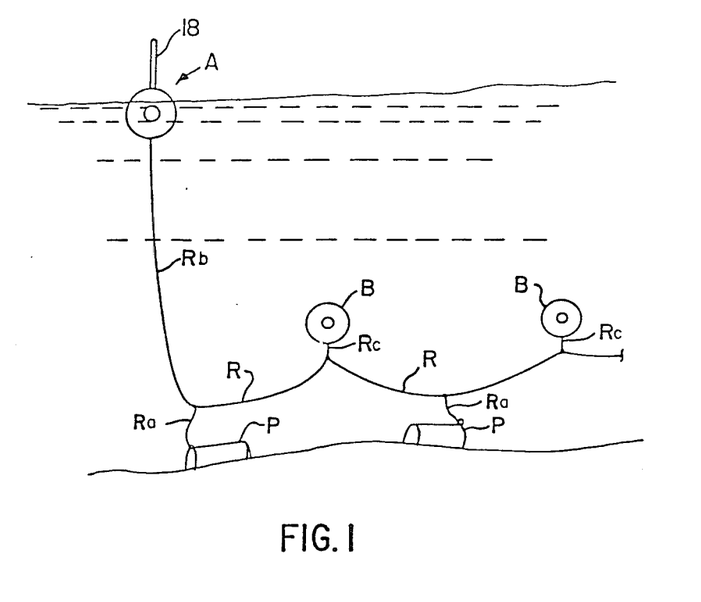
FIG. 1 shows part of a trawl fishing arrangement of lobster pots, using buoys in accordance with this invention.

FIG. 1 shows a series of lobster pots P interconnected by ropes R; in practice a dozen or more pots may be so connected. The pots are not directly connected to rope R, at least in the preferred arrangement, but are connected by short ropes Ra about 10 ft. in length. The end buoy A is connected to rope Rb and has sufficient buoyancy to rest on the surface of the water. Each rope R is connected at its centre to a buoy B by means of another short rope Rc, also about 10 ft. in length. The buoys B, which are termed "trawl" buoys, are not only useful for safely storing the ropes before deployment of the pots, but also hold the ropes off the sea floor so that they do not become snagged on rocks.

Figure 3:
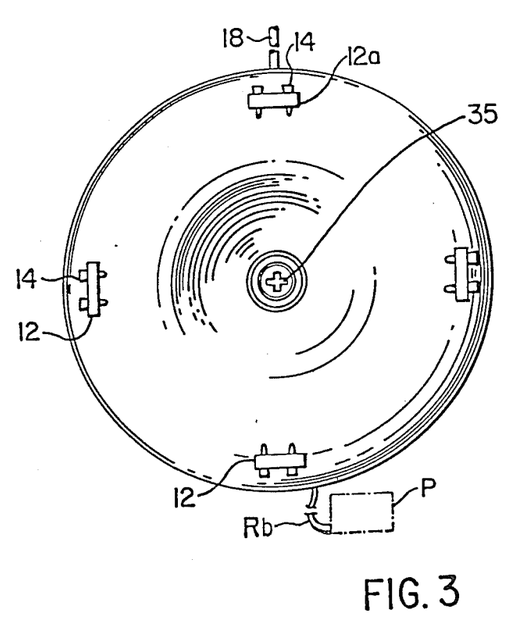
FIG. 3 shows a view on the buoy on lines 3—3 of FIG. 2.

As shown in FIGS. 2 and 3, the buoy A comprises a first side portion 10 and a second side portion 11, which are connected together by four posts 12 having a rectangular cross-section. The posts are rigidly secured to the first side portion 10, and pass through suitably shaped apertures in the portion 11, each post being held in place by two cotters in the form of pegs 14 which can be removed when it is desired to separate the two side portions Post 12a, which is normally at or near the top of the buoy, is provided with a pole or mast 18 which is made easily visibly for use as a marker.

The side portions 10 and 11 are formed of molded plastics material, and in order to provide buoyancy for the buoy the first side portion 10 has a central cavity 20, whereas the second side portion 11 has an annular cavity 21, these cavities forming correspondingly bulged areas on the exterior faces of the side portions. In addition to the exterior surfaces being generally convex, the interior surfaces of the side portions are generally concave especially as provided by inwardly sloping annular lips 10a and 11a. The first side portion 10 is provided with a handle 22. Also, the lip 10a of this side portion has small groove 10b capable of receiving and retaining a rope.

Fixed to the inner central areas of the side portions are bearings 24 which carry the shaft portion 26a of a reel 26, this reel also having side flanges 26b. The flanges are arranged so that their inner surfaces lie outside the planes defined by the lips 10a and 11a of the side portions, in other words the flanges are recessed within the inner surfaces of the side portions.

The shaft portion 26a of the reel has a central transverse bore in which is mounted an eye-bolt 30, held by a lock nut 31 separated from the shaft portion by a washer, so that the bolt is free to rotate. Means other than a lock nut may be used but must be such that the link is rotatable within the bore when the rope has been paid out. The bolt 30 is connectible to the rope Rb of a lobster pot P. The swivel bolt arrangement is such that even though the buoy may turn as it rides on the end of the rope, this will not cause undue twisting of the rope such as would tend to tangle the rope or pull the buoy down in the water.

The second side portion 11 has a central aperture 11b which allows access to one end of the reel shaft portion 26a. This end of the shaft portion is recessed by providing two slots at right angles to each other, thus providing a cross-shaped recess 35 as shown in FIG. 3. This recess is adapted to be engaged by a shaft of cruciform cross-section welded to the center of a so-called "pot-hauler" which is indicated at 40 in FIG. 2.

A "pot-hauler" is a motor driven winch device commonly used in lobster fishing boats, and around which the rope attached to a lobster pot is coiled, and the pot-hauler is then operated to pull up the pot from the sea bed. For use with the buoy of this invention, a shaft 41 of ctuciform cross-section is co-axially welded onto the pot-hauler so as to fit within the recess 35 when the buoy is held as shown with the annular bulging surface of the second side portion close to and co-planar with the pot-hauler outer flange. This provides a motorized winder for the reel. Alternatively, or additionally, a handle may be provided having the same cruciform cross-section so that the reel can be wound manually.

The trawl buoy B may be similar to that of FIGS. 2 and 3 except that no marker pole 18, and less buoyancy, is required.

For trawl fishing, the ropes R connecting the pots have their central portions each attached to a buoy B by short ropes Ra, these ropes and the connecting ropes being wound on the reels by motorized means or by a handle as described above. The outer end pot is secured to buoy A by rope Rb, also wound into the buoy. For conventional lobster fishing, buoy A only may be used, each buoy being connected to one lobster pot. A lobster fishing boat can carry many of these buoys and lobster pots without any danger of the ropes becoming entangled in each other or in other objects. When it is desired to deploy the lobster pots, the buoys and pots are simply thrown overboard at suitable intervals while suitable amounts of rope are paid out from the reel. The buoys can rotate relative to the ropes without entaglement since eye bolts 30 can swivel.

When the fisherman wishes to bring up the pots he can pull in a buoy A and wrap the rope Rb around the pot-hauler and pull up the pot in the usual way. When trawl fishing, all the connecting rope R can also be pulled in using the pot-hauler since the connecting lines Ra and Rc allow the successive pots and buoys to by-pass the pot-hauler. If the pots are to be brought to port, the fisherman can then wind the ropes up in the roller buoys using the pot-hauler to rotate the reel as described. It may be noted that the manner in which the flanges are recessed within the concave inner surfaces of the side portions prevents the rope from passing out over the edges of the flanges during such operation.

When it is desired to replace the rope, or another part of the reel, this can readily be done by removing the cotters 14 and separating the second side portion 11 from the first side portion.

It is also contemplated that a cradle or bracket arrangement for the buoy may be provided, in which the buoys could be held firmly while the reel is rotated by a handle inserted into the recess 35 of the reel; by this means the buoys could be used to raise the lobster pots from the sea-bed. Further, a rail arrangement may be provided whereby buoys can be presented in turn to the pot-hauler and can be held firmly in position adjacent the pot-hauler while this is used to rotate the reel and to raise a lobster pot.

The buoy of this invention may be sold with the reel carrying varying lengths of rope depending on the place where the lobster pot is to be laid. This will save fishermen much time as compared to their present practice of cutting lengths of rope and making this into coils.

FIGS. 4 to 9 show a second buoy in accordance with the invention which has additional features and which is readily assembled.

Figures 4, 5:
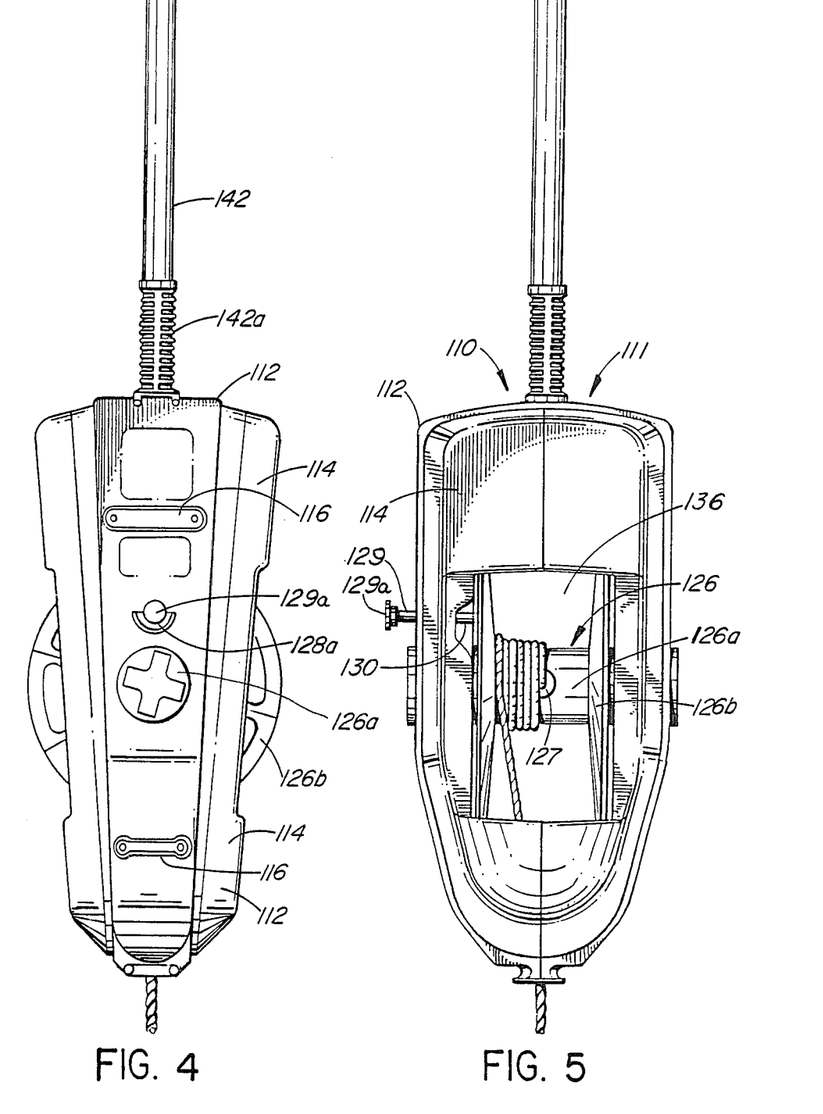
FIG. 4 shows a front elevation of a second buoy.
FIG. 5 shows a side view of the second buoy.
Figure 6:
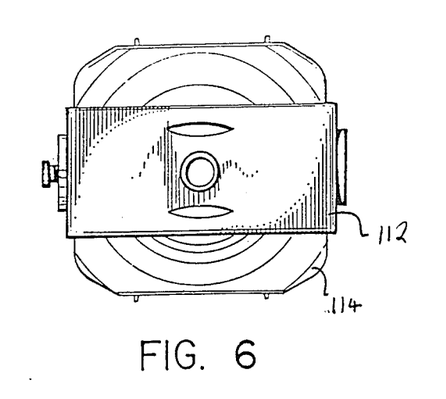
FIGS. 6 and 7 show respectively top and bottom views of the second buoy.
Figure 7:
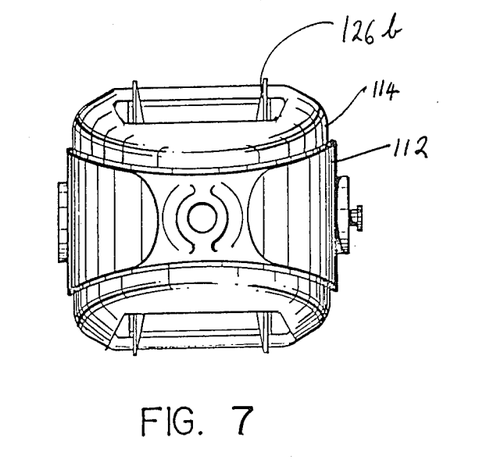
Figure 8:
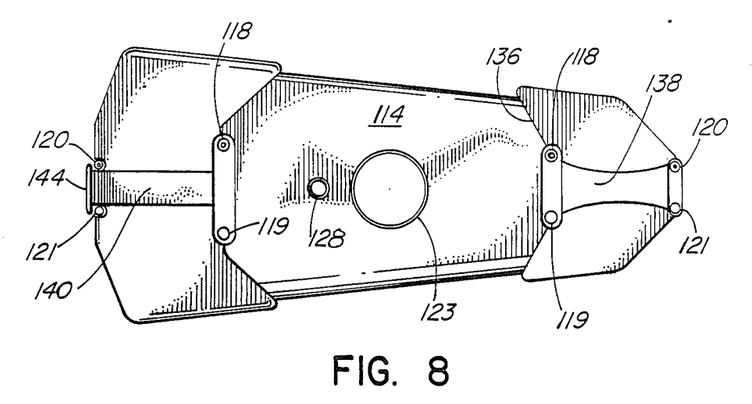
FIG. 8 shows a plan view on the inside of one of the main buoy components.
Figure 9:
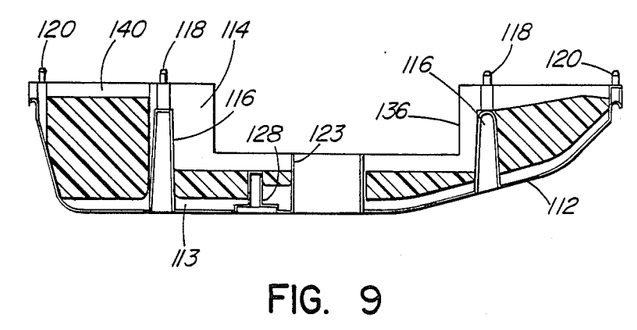
FIG. 9 shows a sectional view of the components on lines 9—9 of FIG. 8.

The main body portion of this buoy is formed of two substantially identical side or casing portions 110, 111, each comprising a single piece of molded plastics material 112 in the form of a generally C-shaped strap, and a buoyant plastics foam material part 114 held within the strap but projecting beyond the sides of the strap as shown in FIG. 4. The strap 112 is thin walled but is strengthened by ribs such as rib 113 shown in FIG. 9. The straps 112 each have upper and lower hollow inner projections or posts 116; the inner ends of these posts each have, on one lateral side, a spigot 118, and on the other lateral side a socket 119. The spigots and sockets 118 and 119 are equally spaced from the centre line of part 112 and are correspondingly sized so that identical spigot and socket formations on the two parts 110 and 111 can fit together when the parts are assembled. These end formations are designed as an interlocking fit so that the buoy can be assembled by pressing these together and no other fastening means are required. Similar interengaging end formations 120 and 121 are formed at mating end portions of the straps 112.

The hollow interior of the uppermost post 116 communicates with the exterior of the buoy and is large enough to accommodate several fingers, this providing a means whereby the buoy may be grasped.

At the centre of each strap part 112, between the posts 116, is an integral inwardly projecting sleeve bearing 123, the two sleeve bearings being aligned and co-axial and supporting the ends of shaft portion 126a of a reel 126 which holds a length of rope. The rope is held onto the shaft portion of the reel by a rotatable link which comprises a pin of plastics material having an enlarged head 127 and which is rotatable in a transverse bore in the reel shaft. The pin itself has a transverse bore to which the rope end is attached. The shaft portion 126a projects slightly beyond each of casing parts 110, 111, and one end of this shaft protion has a cross-shaped recess shown in FIG. 4 for receiving winding means as described for the first embodiment. The use of the recess in the end of the shaft avoids any need for the shaft ot project substantially beyond the bearing means. The reel has flanges 126b which are of spoked construction as shown in FIG. 4; the reel shaft and flanges are all molded of plastics material.

Adjacent the sleeve bearing 123, on one side of the buoy, is a narrow inwardly projecting sleeve 128 in which a shaft 129 is slidably mounted. Shaft 129 has an inwardly projecting inner end 130, which, when button 129a is pushed inwardly, can enter the spaces between the spokes of the reel flanges and prevent rotation of the reel. A rubber washer 128a, held within a recess on the outside of part 112, provides a friction fit for sliding shaft 129 and normally holds this in position.

The buoyant foam material part 114 for each side portion is molded as a single piece having an exterior surface conforming to the interior of part 112 but having grooves for receiving the strengthening ribs of part 112, such as central rib 113. Parts 114 also have apertures for accommodating the posts 116, the bearings 123 and sleeve 128. On the internal surfaces, the parts 114 have central recesses 136 for accommodating the reel, axial convergent/divergent grooves 138 at the bottom of the buoy providing a channel for rope from the reel which also passes out of an outlet formed by recesses between posts 120 and 121 at the lower end of the buoy, and axial semi-circular grooves 140 in the top portion of the buoy which hold the base of a mast 142 extending from the top of the buoy and which corresponds to mast 18 of the first embodiment. In this second embodiment however, the lower portion 142a of the mast is ribbed to facilitate its use as a handle. A collar 144 locates the base of the mast firmly relative to casing part 112.

The buoy construction as described is light and strong, and easily fabricated. Apart from the reel and stop button parts 129, 129a, 130, the buoy comprises easily molded parts i.e. two casing or strap parts 112, two foam plastics parts 114, and a post 142. Assembly of the buoy merely involves placing two parts 114 in their respective strap parts 112, positioning the parts 128, 129, 130, 142 and the reel, and then pushing the side portions together and pressing formations 118, 119, 120 and 121 into firm engagement. The two casing parts 112 and two foam plastics parts 114 may be identical to each other, but the stop button parts 129 etc. will normally be provided only on one side portion.

Figure 10:
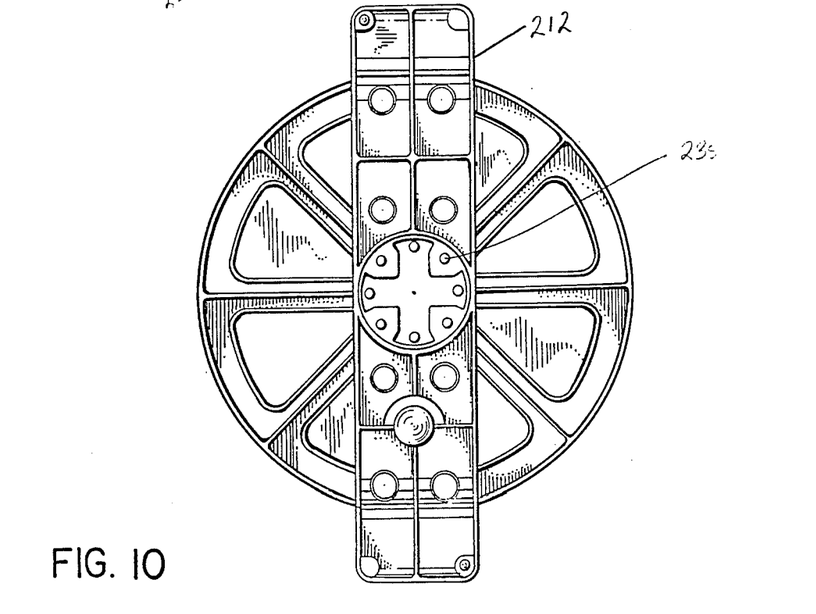
FIG. 10 shows a front elevation of a third buoy in accordance with the invention.
Figure 11:
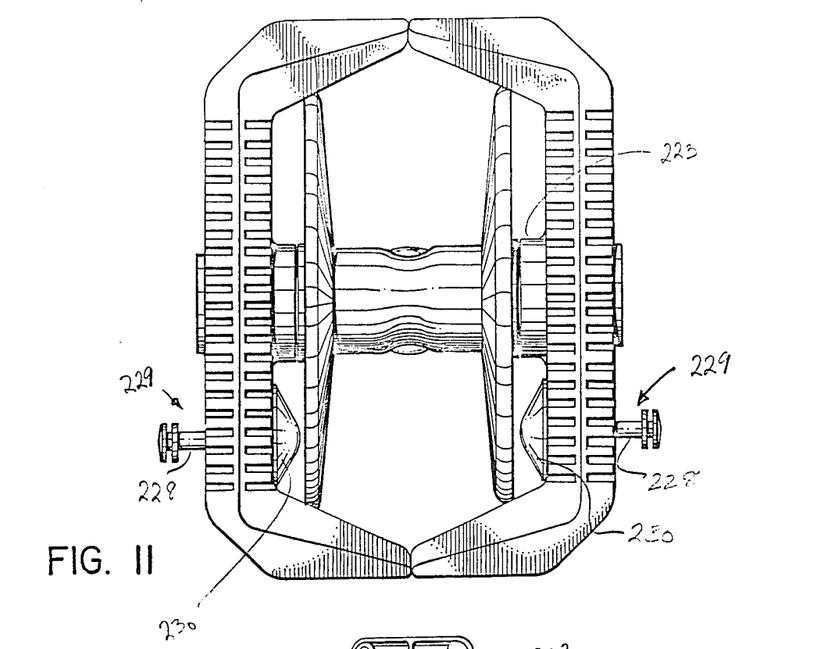
FIG. 11 shows a side elevation of the third buoy.
Figure 12:
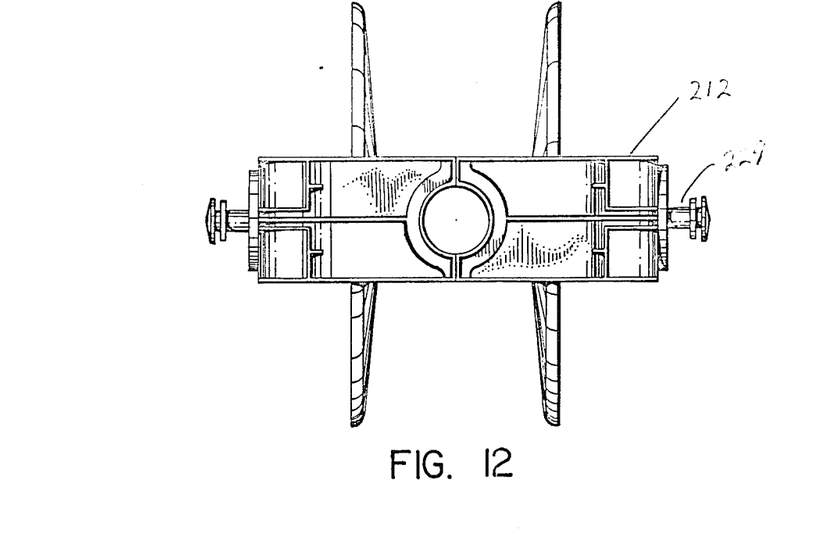
FIG. 12 shows a top end view of the third buoy.

FIGS. 10 to 12 show views of a third embodiment of buoy which is a so-called "trawl" buoy and which is intended to be used as buoy B of FIG. 1. This buoy has a reel with swivel attachment for rope which may be identical to corresponding parts of the second embodiment. In this third embodiment however the side portions of the buoy are each molded of a single piece of plastics material, such as polyethylene, which is chosen to provide sufficient buoyancy for the whole buoy.

This buoy only requires enough buoyancy to hold the ropes off the sea-bed, and should not be so buoyant as to cause any movement of the lobster pots.

Each side portion is a C-shaped molding 212 formed with internal and external strengthening ribs and having sleeve bearings 223 for the shaft portions of the reel and a small sleeve for the stop button assembly 229. In this embodiment two stop button assemblies are used each similar to that described for the second embodiment. Here, however, the inner ends of the button shafts are provided with braking means in the form of conical or mushroom shaped members 230 the apex portions of which engage between the spokes of the reel flanges. These provide a restraint against reel rotation but do not positively prevent rotation; they allow the user to pull out a suitable length of rope before deployment of the buoy by applying enough force to overcome the restraint, but when the buoy is deployed the restraint prevents further rotation of the reel so that the rope remains in place.

The inwardly angled end portions of the moldings 212 each define part of a circular aperture at the top and bottom of the buoy, the top aperture being shown in FIG. 12; the bottom aperture provides a smooth sided outlet channel for rope passing from the reel. At each side of these apertures the molding end portions are provided with corresponding spigot and socket formations such that two identical moldings 212 can be held together with the spigots of one molding fitted into the sockets of the other, as in the second embodiment. The buoy is accordingly very simple to assemble. As in the previous embodiments, an exposed end of the reel shaft has a cross-shaped recess to allow rewinding of the reel. The reel shaft is a hollow plastics molding, and has small holes 235 in the end which allow water to enter the shaft and to prevent it being crushed by water pressure.

We claim:

1. A buoy for storing rope attachable to an underwater object such as a lobster pot comprising:
   (a) two identical casing portions each comprising a single piece of plastics material designed for one-step molding, said casing portions being C-shaped and symmetrically arranged with their end portions together each casing portion have an inwardly projecting sleeve bearing and each portion having a recess, which recesses together provide an outlet for said rope, the two sleeve bearings being aligned and co-axial, said casing portions each having inwardly directed posts which have spigots and sockets at their ends with the spigots of a first casing portion being arranged to register in the sockets of the other side portion; and
   (b) a reel for carrying said rope mounted between said casing members and having a shaft with end portions rotatable in said sleeve bearings.

2. A buoy according to claim 1, wherein said posts include a pair of posts on opposite sides of said outlet for said rope.

3. A buoy according to claim 1, wherein said casing portions together define a collar which holds the lower end of a mast projecting upwardly from the buoy.

4. A buoy according to claim 1, further comprising symmetrically shaped pieces of rigid foam material held between said casing portions, and which together define a recess for the reel.

5. A buoy according ot claim 1, having brake means manually movable laterally in one of siad casing portions and effective when in its innermost position to inhibit rotation of the reel.

6. A buoy according to claim 1, wherein said reel has two end flanges, and having brake means manually movable laterally in one of said casing portions and effective when in its innermost position to inhibit rotation of the reel, said brake means being provided by a conical member having its apex capable of being held against the outer surface of at least one flange of said reel which flange has spokes engaging with said brake means.

7. A buoy for storing rope attachable to an underwater object such as a lobster pot, comprising:
   (a) two identical symmetrically arranged casing portions each comprising a strap part of plastics material designed for one-step molding, said casing portions being C-shaped and oppositely arranged so as to have their upper ends close together, each casing portion having an inwardly projecting sleeve portion, the two opposed sleeve portions being aligned and co-axial, said casing portions each having inwardly directed posts which have spigots and sockets at their ends with the spigots of a first casing portion being arranged to register in the sockets of the other side portion;

(b) a reel for carrying said rope mounted between said casing members and having a shaft with end portions rotatable in said sleeve bearings; and (c) two identical pieces of rigid foam material shaped and symmetrically arranged to define a recess for said reel and having their central areas held between said casing portions, and wherein said posts include posts above and below said recess for the reel and spaced from the upper and lower end of the buoy.

8. A buoy according to claim 7, wherein the uppermost of said posts is hollow to provide a recess communicating with the exterior of the buoy and provides a holding means suitable for insertion of fingers.

9. A buoy for storing rope connected to an article such as a lobster pot which is to be deployed underwater, comprising a buoyant casing having two side portions connected together, a reel having a shaft rotatably mounted between said side portions and carrying the rope, wherein one side portion has an aperture to provide access to one end of said shaft from a side of the buoy, said one end having a non-circular recess adapted to be engaged by a winding means independent of the buoy structure, and wherein said rope is connected to said reel by means of a link located within a transverse bore in the reel and held by means which ensures that the link is at all times rotatable within said bore, whereby when the rope is fully paid out from the reel the buoy is free to rotate relative to the rope.

10. A buoy for storing rope connected to an article such as a lobster pot which is to be deployed underwater, comprising a buoyant casing having two side portions connected together, a reel having a shaft rotatably mounted between said side portions and carrying the rope, wherein one side portion has an aperture to provide access to one end of said shaft from a side of the buoy, said one end having a non-circular recess adapted to be engaged by a winding means independent of the buoy structure, and wherein said side portions each comprise a single piece of plastics material designed for one-step molding, said side portions being of C-shaped and symmetrically oppositely arranged to define a recess for the reel, and each side portion having an inwardly projecting sleeve portion with the two opposed sleeve portions being aligned for holding said shaft, and each side portion having inwardly directed posts with end formations fastenable to the end formation of an opposed post.

11. A buoy according to claim 10, wherein said side portions are identical moldings, and wherein said posts include spigots and sockets with each spigot of a first side portion fitting within a socket of the other side portion.

* * * * *